(12) United States Patent
Binetti et al.

(10) Patent No.: US 7,876,764 B2
(45) Date of Patent: Jan. 25, 2011

(54) MULTIPLE AGGREGATION PROTOCOL SESSIONS IN A DAISY CHAIN NETWORK

(75) Inventors: Stefano Binetti, Monza (IT); Hiroshi Suzuki, Palo Alto, CA (US); Shreeram Bhide, San Jose, CA (US); Sitaram Dontu, Sunnyvale, CA (US); Pagalavan Krishnamoorthy, San Jose, CA (US); Chien Fang, Danville, CA (US); Norman W. Finn, Livermore, CA (US)

(73) Assignee: Cisco Technology, Inc., San Jose, CA (US)

( * ) Notice: Subject to any disclaimer, the term of this patent is extended or adjusted under 35 U.S.C. 154(b) by 722 days.

(21) Appl. No.: 11/247,468

(22) Filed: Oct. 11, 2005

(65) Prior Publication Data
US 2007/0081557 A1    Apr. 12, 2007

(51) Int. Cl.
*H04L 12/56* (2006.01)
(52) U.S. Cl. .................. 370/395.53; 370/392; 370/389
(58) Field of Classification Search .................. 370/227, 370/469, 475, 216, 229, 389, 395.53, 392, 370/428
See application file for complete search history.

(56) References Cited

U.S. PATENT DOCUMENTS

| 5,959,968 | A |  | 9/1999 | Chin et al. ............... 370/216 |
| 5,987,526 | A | * | 11/1999 | Morales ..................... 709/249 |
| 6,229,538 | B1 | * | 5/2001 | McIntyre et al. ............ 715/734 |
| 6,256,292 | B1 | * | 7/2001 | Ellis et al. .................... 370/227 |
| 6,614,808 | B1 | * | 9/2003 | Gopalakrishna ............ 370/469 |
| 6,631,141 | B1 | * | 10/2003 | Kumar et al. ............... 370/469 |
| 6,819,680 | B2 | * | 11/2004 | Hickman et al. ............ 370/475 |
| 6,910,149 | B2 |  | 6/2005 | Perloff et al. ................... 714/4 |
| 6,956,824 | B2 |  | 10/2005 | Mark et al. ................. 370/242 |
| 7,002,993 | B1 | * | 2/2006 | Mohaban et al. ............ 370/471 |
| 2002/0110148 | A1 | * | 8/2002 | Hickman et al. ............ 370/475 |
| 2004/0098501 | A1 |  | 5/2004 | Finn ........................... 709/236 |
| 2004/0156313 | A1 | * | 8/2004 | Hofmeister et al. ......... 370/229 |
| 2006/0092942 | A1 | * | 5/2006 | Newson et al. .............. 370/392 |

\* cited by examiner

*Primary Examiner*—William Trost, IV
*Assistant Examiner*—Emmanuel Maglo
(74) *Attorney, Agent, or Firm*—Campbell Stephenson LLP

(57) ABSTRACT

Various systems and methods that allow multiple aggregation protocol sessions to be established in a daisy chain network are disclosed. One method involves sending a first aggregation protocol packet and a first session identifier associated therewith to a first network device via a first interface and sending a second aggregation protocol packet and a second session identifier associated therewith to a second network device via the first interface.

16 Claims, 6 Drawing Sheets

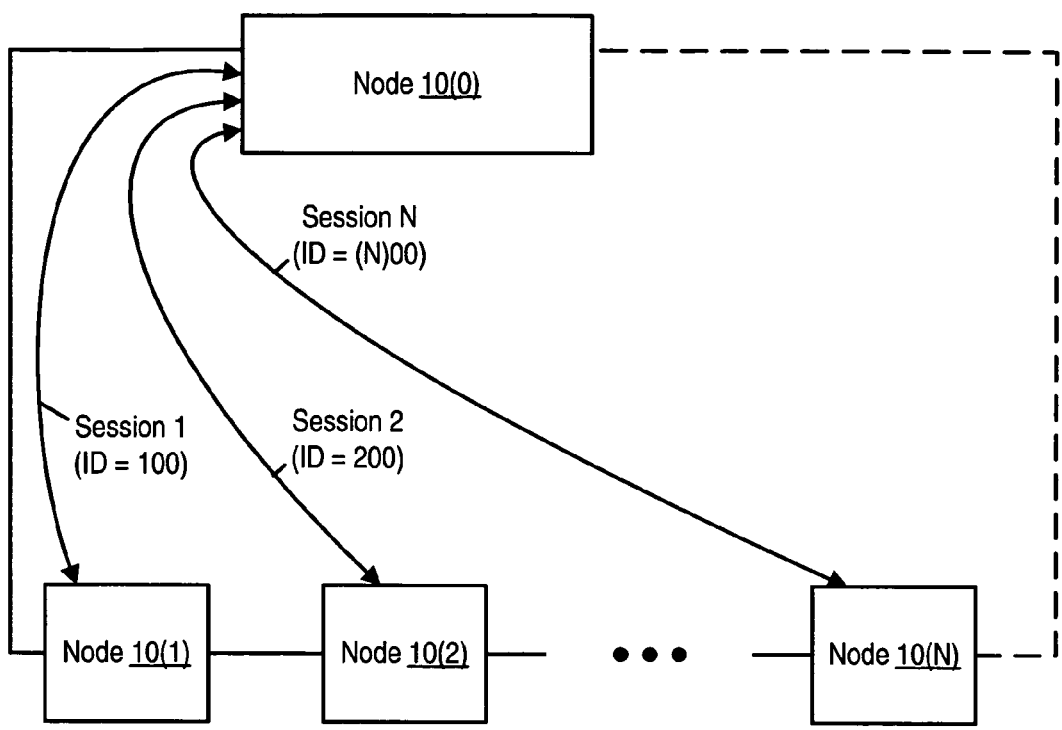
FIG. 1 - Physical Topology

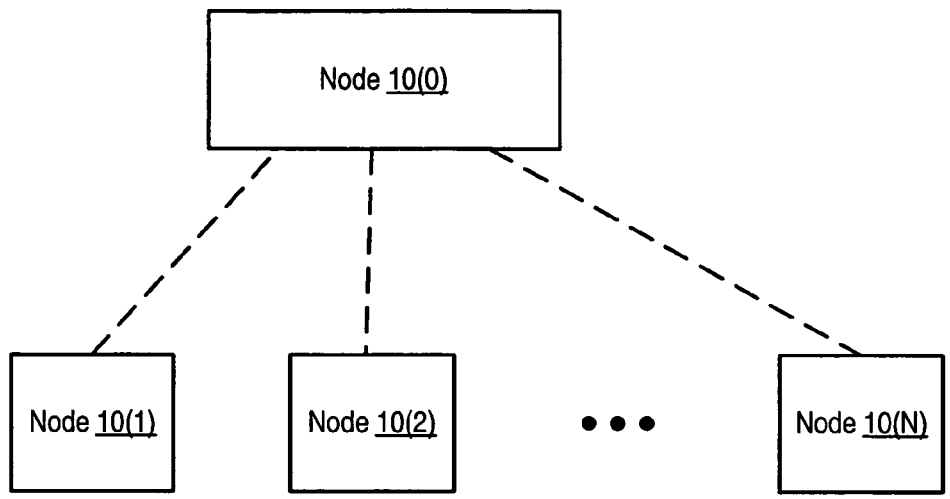
FIG. 2A - Logical Topology
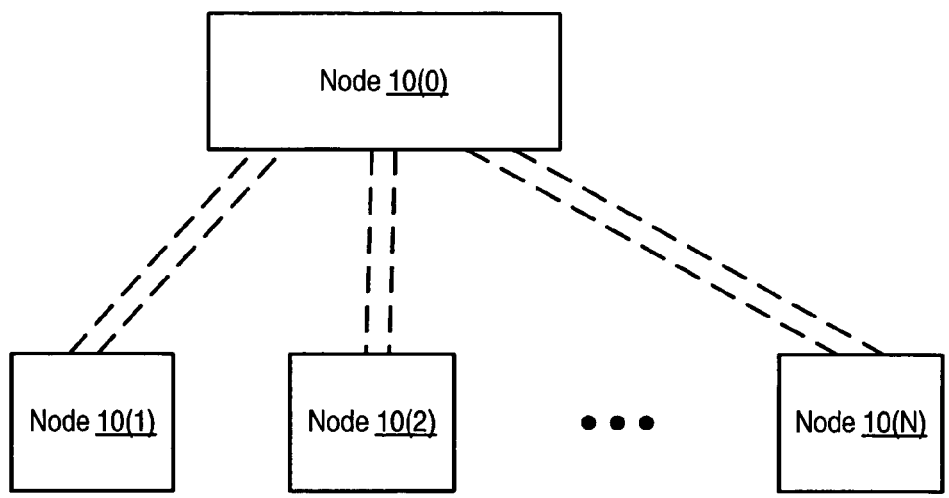
FIG. 2B - Logical Topology

MULTIPLE AGGREGATION PROTOCOL SESSIONS IN A DAISY CHAIN NETWORK

FIELD OF THE INVENTION

This invention relates to networking and, more particularly, to aggregation protocols.

DESCRIPTION OF THE RELATED ART

Sophisticated network devices, such as routers, often have limited scalability. For example, a router may support a maximum number of ports. As a result, a customer that requires a few ports more than the maximum will have to purchase two routers, despite only needing slightly more ports than are provided by a single router. Since sophisticated network devices tend to be expensive, having to purchase an additional router can be a significant expense.

In order to improve the scalability of sophisticated network devices, systems are being designed in which one network device (referred to as the primary device) configures, controls, and/or performs certain functions for other network devices (referred to as secondary devices). For example, a primary device can be configured to perform routing and/or forwarding for secondary devices. These secondary devices effectively behave like internal components (e.g., line cards) of the primary device, and thus secondary devices can be used to supplement the number of ports that are effectively available on the primary device. Because the secondary devices do not need to implement certain functionality (since those functionality is provided by the primary device), the secondary devices can be much less expensive than the primary device. Accordingly, once a customer has purchased a primary device, the customer can add on less expensive secondary devices any time that the customer requires additional ports for the primary device.

In some systems, the primary network device uses an aggregation protocol (such as Link Aggregation Control Protocol (LACP) or Port Aggregation Protocol (PAgP)) to establish a control relationship with each secondary device. This control relationship enables the primary device to configure, control, and/or perform certain functions for the secondary device. For scalability purposes, it is desirable to be able to connect several secondary devices to a single port of the primary network device using a daisy chain arrangement. However, such an arrangement is not currently feasible, since aggregation protocols can only be used between directly-connected devices. Thus, in current systems, the primary device must be connected to each secondary device by a separate port. Accordingly, techniques that allow several secondary devices to be coupled to a primary network device via a daisy chain arrangement are desirable. Such techniques need to allow non-directly-connected devices to participate in aggregation protocol sessions with each other.

BRIEF DESCRIPTION OF THE DRAWINGS

A more complete understanding of the present invention may be acquired by referring to the following description and the accompanying drawings, in which like reference numbers indicate like features.

FIG. 1 is a block diagram of a daisy chain topology that interconnects N+1 nodes, according to one embodiment of the present invention.

FIGS. 2A and 2B each show an example of the logical topology of a network such as the one shown in FIG. 1, after aggregation protocol sessions have been established between Node 0 and each of Nodes 1 through N.

Figure 3:
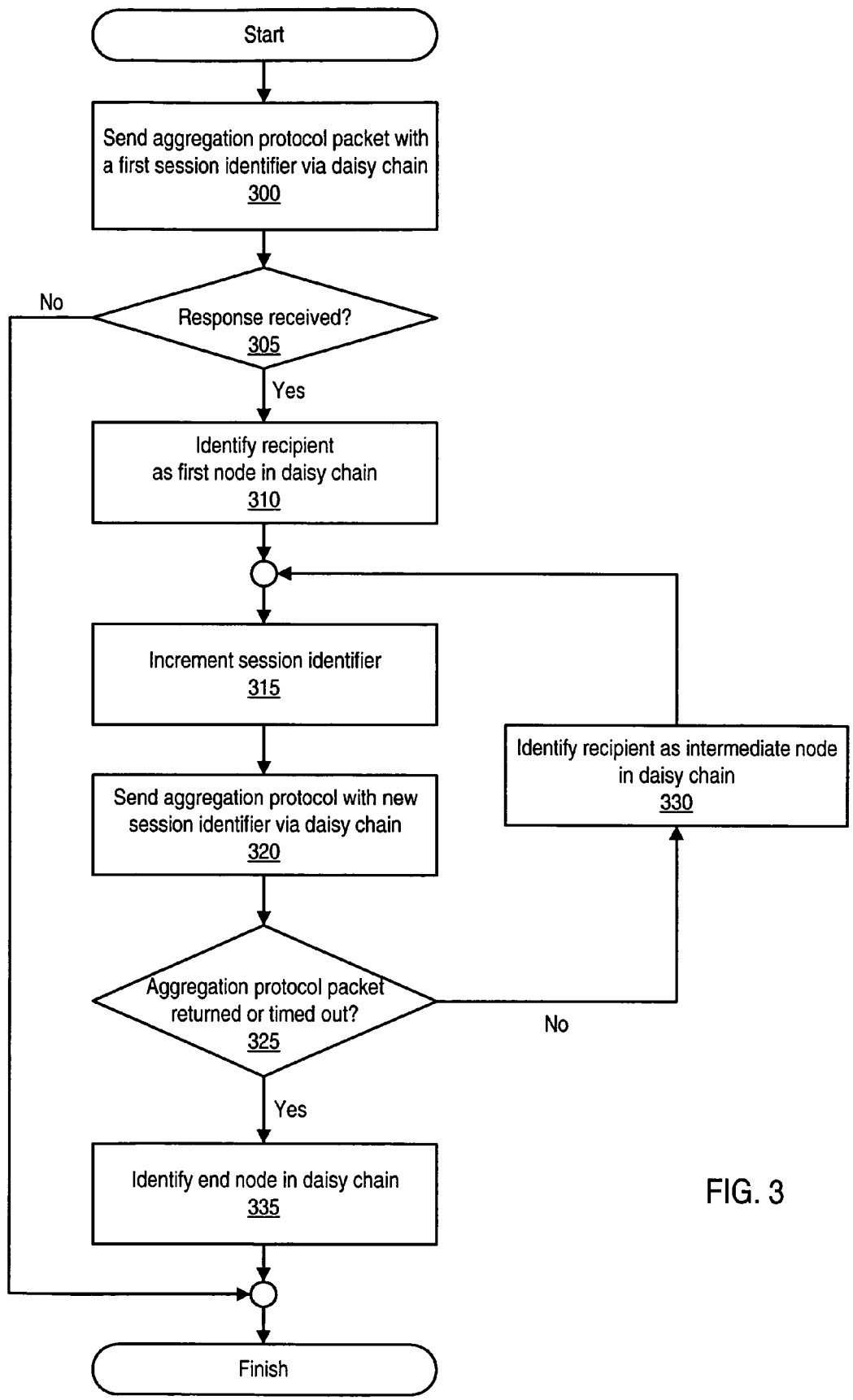
FIG. 3 is a flowchart of one embodiment of a method of establishing multiple aggregation protocol sessions concurrently, via a single link.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 shows a daisy chain topology that interconnects N+1 network nodes, Nodes 10(0)-10(N), where N is an integer greater than or equal to one. Each node is some sort of network device, such as a router, switch, or bridge. In one embodiment, Node 10(0) is a primary device and Nodes 10(1)-10(N) are secondary devices. In such an embodiment, Node 10(0) configures, controls, and/or performs certain functions (e.g., such as routing and/or forwarding) for Nodes 10(10)-10(N).

The solid lines that connect nodes represent physical links. The dashed line between Node 10(N) and Node 10(0) represents an optional link that can connect the ends of the daisy chain to provide a redundant pathway (a configuration that includes such a redundant pathway is referred to herein as a "protected" daisy chain).

Node 10(0) establishes an aggregation protocol session, using an aggregation protocol such as Port Aggregation Protocol (PAgP) or Link Aggregation Control Protocol (LACP), with each of nodes 10(1)-10(N). Each aggregation protocol session is used to detect whether multiple links are present between a pair of network nodes and, if so, to aggregate those links into a single logical link. In particular, Session 1 is established between Node 10(0) and Node 10(1), which are directly connected. Session 2 is established between Node 10(0) and Node 10(2), via Node 10(1). Session 10(N) is established between Node 10(0) and Node 10(N), via Nodes 10(1) through 10(N−1). This use of multiple sessions allows Nodes 10(1)-10(N) to operate as if those nodes were each directly connected to Node 10(0) by point-to-point interconnection.

In order to be able to establish aggregation protocol sessions with nodes that are not directly connected with Node 10(0), Node 10(0) uses different identifiers to identify each session, and each session is associated with a different one of Nodes 10(1) through 10(N). These session identifiers are appended to or included in the aggregation protocol packets sent to and from each node. For example, a session identifier can be included within a type-length-value field or within a field of the header (e.g., a destination field) of each aggregation protocol packet.

Nodes 10(1) through 10(N) are configured to only process aggregation protocol packets that are associated with a respective one of the session identifiers. For example, Node 10(1) can be configured to only process aggregation protocol packets that are associated with session identifier 1, while Node 10(2) can be configured to only process aggregation protocol packets that are associated with session identifier 2. In one embodiment, the association between each node and a session identifier is configured dynamically during operation (as opposed to being preconfigured, for example, by an administrator). This scenario also allows Node 10(0) to automatically detect how many nodes are included in the daisy chain.

As an example, Session 1 can be initiated when Node 10(0) is powered on and initially sends an aggregation protocol packet that is associated with a first session identifier, 100, towards Node 10(1). Node 10(1) receives and processes this packet and determines that session identifier 100 is now associated with Node 10(1). Node 10(1) can then send an aggregation protocol packet, which includes session identifier 100 or to which session identifier 100 has been appended, back to Node 10(0). At this point, Session 1 is established. Node 10(0) determines that at least one node is included in the daisy chain, and that session identifier 100 is used to identify aggregation protocol packets being communicated between Nodes 10(0) and 10(1).

Node 10(0) then initiates Session 2 sends another aggregation protocol packet, which is associated with a second session identifier, 200, towards Node 10(1). Node 10(1) receives this packet and, because the packet is associated with a session identifier other than 100, Node 10(1) forwards the packet to the next node along the daisy chain. Node 10(2) then receives the packet and Session 2 is established in the same manner as Session 1.

After Session 2 is established, Node (0) attempts to initiate additional sessions, using a different identifier for each session (e.g., using session identifiers 300 through (N)00). Each of Nodes 10(1) through 10(N) only processes aggregation protocol packets that are associated with a respective identifier; aggregation protocol packets that are associated with other identifiers are passed to subsequent nodes along the daisy chain. For example, Node 10(1) will process aggregation protocol packets associated with session identifier 100 and will forward all other aggregation protocol packets along the daisy chain (e.g., an aggregation protocol packet received from Node 10(0) will be sent towards Node 10(2), and vice versa). The last node in the daisy chain, Node 10(N), can either return such aggregation protocol packets to Node 10(0) (e.g., Node 10(N) can return the packets to Node 10(0) if a return link is provided, as shown by the dashed line in FIG. 1) or drop such aggregation protocol packets.

Session N (which takes place between nodes 10(0) and 10(N) is the last session that is established. When Node 10(0) sends an aggregation protocol packet that is associated with a new session identifier in an attempt to initiate Session N+1, either the protocol packet will be returned to Node 10(0) (e.g., via the return link, if provided) or no response to that protocol packet will be returned within a timeout period (e.g., if Node 10(0) simply drops the packet). If the aggregation protocol packet is returned or times out, Node 10(0) will determine that aggregation protocol sessions have been established with all of the nodes currently in the daisy chain. Node 10(0) can construct a list that identifies each node along the daisy chain, in the order that each node is reached (e.g., the list can identify that Node 10(1) is closest to Node 10(0) left interface, followed by Nodes 10(2)-10(N) in that order). Node 10(0) can periodically attempt to send an aggregation protocol packet with a new session identifier along the daisy chain, in order to detect new nodes that may be added to the daisy chain at a later time.

Similar sessions can also be established in the opposite direction, if the nodes are connected in a protected daisy chain (e.g., if the link represented by the dashed line is present). For example, sessions can be established directly between Nodes 10(0) and 10(N), indirectly between Nodes 10(0) and 10(2) via Nodes 10(N) through 10(3), and indirectly between Nodes 10(0) and 10(1) via Nodes 10(N) through 10(2).

A different session identifier can be associated with each interface of each of Nodes 10(1)-10(N). For example, the interface of Node 10(1) that faces Node 10(0) can be associated with session identifier 100, while the interface of Node 10(1) that faces Node 10(2) can be associated with session identifier 101. Node 10(1) will thus process aggregation protocol packets that are associated with either session identifier 100 or session identifier 101. All other aggregation protocol packets received by Node 10(1) will be passed along the daisy chain.

In such an embodiment, once aggregation protocol sessions in both directions have been established between a pair of nodes, the aggregation protocol can aggregate the links, creating a logical link. For example, the aggregated logical link between Node 10(0) and Node 10(1) includes the direct link coupling Node 10(0) and Node 10(1) as well as the indirect link between Nodes 10(0) and 10(1) that passes through Nodes 10(2) through 10(N)). The aggregated logical link provides the ability to fail over from one physical link in the aggregated logical link to the other. Additionally, the aggregated logical link provides the ability to load balance traffic over the logical link by subdividing traffic among the physical links included in the aggregated logical link (it is noted, however, that some embodiments may not implement load balancing over aggregated logical links implemented in this manner).

In some embodiments that employ protected daisy chain configurations, Node 10(0) configures Nodes 10(1)-10(N) to selectively use a single interface, referred to herein as the "upstream" interface, for normal communications with Node 10(0) via the daisy chain. The non-selected interface is the "downstream" interface and is only used to propagate packets to nodes that are located in the downstream direction. The interface used by Node 10(0) to send data packets to a particular node is the "active" interface with respect to that node; the other interface (within Node 10(0)) that is coupled to the daisy chain (if any) is the "redundant" interface with respect to that node. For example, if Node 10(0) configures each of Nodes 10(1)-10(N) to use their left interfaces ("left" refers to the orientation of the interfaces shown in FIG. 1) as the upstream interface, Node 10(0) also configures its left interface as its active interface. If a failure prevents Node 10(0) from being able to communicate with another node on the daisy chain via the active interface, Node 10(0) will begin using the redundant interface as the active interface in order to be able to continue communicating with the node.

In such embodiments, traffic is not load-balanced over the aggregated logical links; instead, the redundant links are used only for redundancy purposes. For example, in the system of FIG. 1, Node 10(0) can select to use its left (or west) interface to send data packets to Nodes 10(1)-10(N). In response, Node 10(0) configures Nodes 10(1)-10(N) to each use their left (with respect to the depiction in FIG. 1) or west interfaces as upstream interfaces. Node 10(0) can configure Nodes 10(1) to use the left interface as the upstream interface by including information identifying the left interface as the upstream interface in aggregation protocol packets (e.g., this information can be included in a special Type, Length, Value (TLV) field of the aggregation protocol packets). It is noted that Node 10(0) continues to exchange aggregation protocol packets, via its redundant interface, with the downstream interfaces of Nodes 10(1)-10(N); however, Node 10(0) does not send data packets to the downstream interfaces.

In embodiments that select "upstream" interfaces, nodes can select a new upstream interface in response to failures. Failures can be detected by any of Nodes 10(0)-10(N) in response to either directly detecting a failed device or link or in response to an aggregation protocol packet not being returned within a timeout period. In response to directly detecting a failure, Nodes 10(1)-10(N) can send information (e.g., in a TLV within an aggregation protocol packet) to Node 10(0) identifying the failure (e.g., by identifying the interface that is coupled to the failed device or link). Nodes 10(1) can also automatically designate the other interface as the upstream interface in response to detecting a failure at the current upstream interface.

For example, if the link between Nodes 10(1) and 10(2) fails, Nodes 10(2)-10(N) will need to use their right, or east, interfaces as the "upstream" interface. The left interface (the current upstream interface) of Node 10(2) can detect the failed link and send notification of the failure to Node 10(0) via the right interface. Node 10(2) also reconfigures its right interface as the upstream interface. In response to receiving notice of the failure (either directly from Node 10(2) or in response to an aggregation protocol packet sent to the right interface of Node 10(2) timing out, Node 10(0) reconfigures Nodes 10(3)-10(N) to use their right interfaces as upstream interfaces (alternatively, Nodes 10(3)-10(N) can automatically reconfigure their upstream interface without intervention from Node 10(0) as aggregation protocol packets sent from their left interfaces time out).

In response to detecting the failure (e.g., either by receiving notification from one of the other nodes or by detecting that an aggregation protocol packet has timed out), Node 10(0) will also begin sending data traffic to the other nodes in a manner that avoids the failed link. For example, if the link between Nodes 10(1) and 10(2) fails, Node 10(0) can begin sending data traffic to Nodes 10(2)-10(N) via its right interface. Node 10(0) will continue to communicate with Node 10(1) via the left interface of Node 10(1) (since it will be impossible to communicate with Node 10(1) via its right interface after the link failure).

As noted above, in some embodiments, Node 10(0) is a primary device that includes functionality to configure, control, and/or perform certain functions for Nodes 10(1) through 10(N). This functionality may not be present in Nodes 10(1) through 10(N). For example, in one embodiment, Node 10(0) includes functionality to perform Layer 2 forwarding and Layer 3 routing for Nodes 10(1) through 10(N), and Nodes 10(1) through 10(N) lack any Layer 2 or Layer 3 functionality. Accordingly, Node 10(0) performs forwarding and routing for Nodes 10(1) through 10(N). In situations in which a primary device (e.g., such as Node 10(0)) performs routing and/or forwarding for other nodes (e.g., such as Nodes 10(1)-10(N)), the other nodes are described as "satellite network devices."

In an embodiment that includes satellite network devices, after Node 10(0) establishes aggregation protocol sessions with each of Nodes 10(1) through 10(N), Node 10(O) can then associate the session identifiers with other packets (e.g., other control and/or data packets) sent on the daisy chain in order to identify the appropriate recipient of each packet. For example, Node 10(0) can append the session identifier to each packet (e.g., by attaching a supplemental header to each packet and including the session identifier in the supplemental header). Alternatively, Node 10(0) can insert the session identifier into an existing field of an existing packet header within each packet. Nodes 10(1)-10(N) are configured to parse headers for session identifiers and use these session identifier to decide whether to consume a packet or forward the packet to another node along the daisy chain. The use of the session identifiers allows Nodes 10(1) through 10(N) to pass the packets to the appropriate node along the daisy chain, despite not having forwarding capabilities.

It is noted that in embodiments where Nodes 10(1)-10(N) lack forwarding capabilities, these nodes cannot forward packets based on destination address. Accordingly, the use of session identifiers allows Nodes 10(1)-10(N) to forward packets to other nodes along the daisy chain, without relying on the destination address specified in the packets. The session identifiers also allow each node to identify whether it is the proper recipient of a particular packet.

FIG. 2A shows the logical topology of the network of FIG. 1, after the aggregation protocol sessions have been established between Node 10(0) and each of Nodes 10(1) through 10(N), in an embodiment in which Nodes 10(1)-10(N) are connected in a non-protected daisy chain arrangement. Nodes 10(1) through 10(N) are now logically connected to Node 10(0) via a multipoint-to-point link, shown as dashed lines in FIG. 2, as a result of having established an aggregation protocol session with Node 10(0). The multipoint-to-point link is managed by the aggregation protocol sessions. The logical connections that make up the multipoint-to-point link can each include several physical links and/or intervening network devices.

FIG. 2B shows the logical topology of the network of FIG. 1, after the aggregation protocol sessions have been established between Node 10(0) and each of Nodes 10(1) through 10(N), in an embodiment in which Nodes 10(1)-10(N) are connected in a protected daisy chain arrangement. As in FIG. 2B, Nodes 10(1) through 10(N) are now logically connected to Node 10(0) via a multipoint-to-point link, shown as dashed lines in FIG. 2, as a result of having established an aggregation protocol session with Node 10(0). Since the nodes are coupled in a protected daisy chain arrangement (e.g., where the link represented by the dashed line in FIG. 1 is present), each of Nodes 10(1)-10(N) now has two logical links coupling that node to Node 10(0). In one embodiment, these two links are operated so that only one link is active at a time; the other non-active link is available for failover in case of a failure. As in FIG. 2A, the multipoint-to-point link is managed by the aggregation protocol sessions. The logical connections that make up the multipoint-to-point link can each include several physical links and/or intervening network devices.

FIG. 3 is a flowchart of a method of establishing multiple aggregation protocol sessions concurrently, via a single link. This method can be performed by a node, such as Node 10(0) of FIGS. 1 and 2, that is coupled to several other nodes by a daisy chain. This node is referred to as the primary node in order to distinguish the primary node from other nodes in the daisy chain.

The method begins at 300, when the primary node sends an aggregation protocol packet via the daisy chain. This aggregation protocol packet includes a first session identifier. In one embodiment, the session identifier is included in a destination index field of the aggregation protocol packet. The aggregation protocol packet can also identify the primary node (e.g., by including the primary node's identifier in a source index field).

If a response to the aggregation protocol packet is received, as determined at 305, the recipient of the first aggregation protocol packet (sent at 300) is identified as the first node in the daisy chain, as shown at 310 (e.g., the primary node can identify the first node by adding information identifying that node to a list). The primary node then increments (or otherwise changes) the session identifier, as shown at 315, and sends a new aggregation protocol packet that includes the new session identifier via the daisy chain, as shown at 320. It is noted that the aggregation protocol packets sent at 300 and 320 are sent via the same interface of the primary node.

If the primary node receives a response to the aggregation protocol packet sent at 325, the primary node identifies the recipient as an intermediate node in the daisy chain (e.g., by adding information identifying the recipient to a list). If the aggregation protocol packet sent at 325 is instead returned or timed out (i.e., if no response to the aggregation protocol packet is received within the time out period), as detected at 325, the primary node identifies the end node in the daisy chain, as shown at 335. The end node is the last node in the daisy chain that returned an aggregation protocol packet.

While functions 300-335 are being performed at one interface of the primary node, the primary node can also be performing functions 300-335 at another interface, if the daisy chain is operating in a protected configuration. The primary node uses different session identifiers at each interface, so that the same session identifier will not be used by both interfaces. Furthermore, functions 300-335 can be repeated periodically.

The primary node can configure each node in the daisy chain after all of the nodes along the daisy chain have been identified using the method of FIG. 3. For example, the primary node can use aggregation protocol packets to identify each node along the daisy chain. After identifying all of the nodes, the primary node can configure the nodes by sending aggregation protocol packets to each node. The aggregation protocol packets can include information identifying the upstream interface, as well as information identifying whether the recipient is a first, last, or intermediate node along the daisy chain (first, last, and intermediate are defined with respect to the upstream direction).

Figure 4:
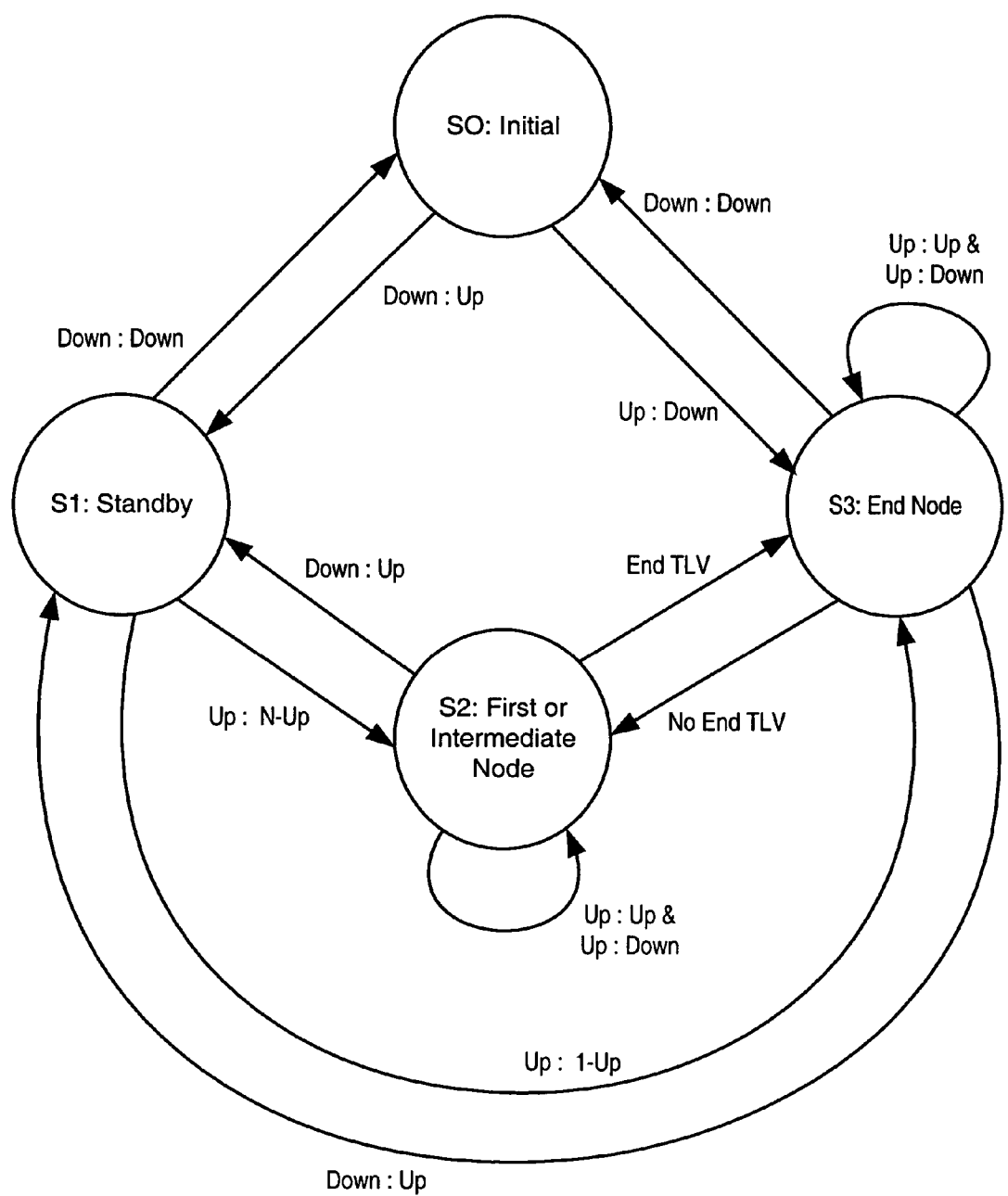
FIG. 4 is a state diagram illustrating the various states of an interface, according to one embodiment of the present invention.

FIG. 4 is a state diagram illustrating the various states of an interface within a non-primary node. State transitions occur when the status of the interface or its partner interface (i.e., the other interface within the node that is coupled to the daisy chain) changes. For example, if a node includes a left and a right interface coupled to the daisy chain, the state of the left interface can change when the status of the left interface changes or when the status of the ring interface changes. These changes are identified by the notation X:Y in FIG. 4, where X is the status of the interface and Y is the status of the partner interface. An interface is "Up" when the interface has been configured by the primary node as either the first upstream interface in the daisy chain ("1-Up") or a non-first upstream interface ("N-Up"). The 1-Up and N-Up statuses are configured when the primary node sends an aggregation protocol packet with information identifying either 1-Up or N-Up status to the interface. An interface can be configured in response to receiving an aggregation protocol packet, which includes the interface's session identifier along with configuration information, from the primary node. If an interface has not yet been configured, or if the interface has failed or detected a link failure, the interface is "Down."

The first state, S0, is the initial state that an interface defaults to upon power-up. In this state, the interface will consume (i.e., not forward) all packets received by that interface. The interface will only process control packets, such as aggregation protocol packets. Any data packets received by the interface in this state will be dropped.

The next state, S1, is a standby state. In this state, the interface consumes all packets sent by the primary node (in one embodiment, these packets can be identified by the destination index included in each packet). The interface will forward packets that were sent by other non-primary nodes.

State S2 is the state of an interface that is the upstream interface in a node that is not the last node in the daisy chain. In this state, the interface will consume packets that are being sent to the node. The interface uses its session identifier, which is provided to the interface by the primary node, to identify packets that are being sent to that node. If a packet includes the session identifier that is associated with the interface, the interface consumes the packet. Otherwise, the node forwards the packet to the partner interface.

The final state, S3, is the state of the upstream interface in the final node along the daisy chain. This interface consumes packets that are addressed to the node (i.e., packets having the session identifier that is associated with the interface). The interface drops (discards without forwarding) any data packets that are received from other non-primary nodes. All other packets (e.g., other aggregation protocol packets) are forwarded from the partner interface (this partner interface will only be active if the daisy chain is being operated in a protected configuration, however).

As noted above, when a node is powered up, both interfaces that are coupled to the daisy chain will begin operating in state S0. Thus, an interface begins operation in state S0. If either the interface or its partner interface transition to "Up" status, the interface will change state. If the interface itself is "Up," the interface transitions to state S3. If only the partner interface is "Up," the interface transitions to state S1. If both the interface and its partner interface transition back to "Down" status, both interfaces will return to state S0.

In state S1, if the interface transitions to "Up" and its partner interface transitions to "N-Up" (an intermediate interface along the daisy chain), the interface will transition to state S2. If the interface transitions to "Up" and its partner interface transitions to "1-Up," the interface will transition to state S3.

In state S2, if the interface transitions to "Down" status, the interface will transition to state S1. If the interface receives an aggregation protocol packet from the primary node having an "End TLV" (a TLV storing information that identifies the interface as the final interface in the daisy chain), the interface transitions to state S3.

In state S3, if the interface changes status to "Down" and the partner interface remains "Up," the interface will transition to state S1. If the interface receives an aggregation protocol packet from the primary node that lacks the "End TLV," the interface will transition to state S2.

Figure 5:
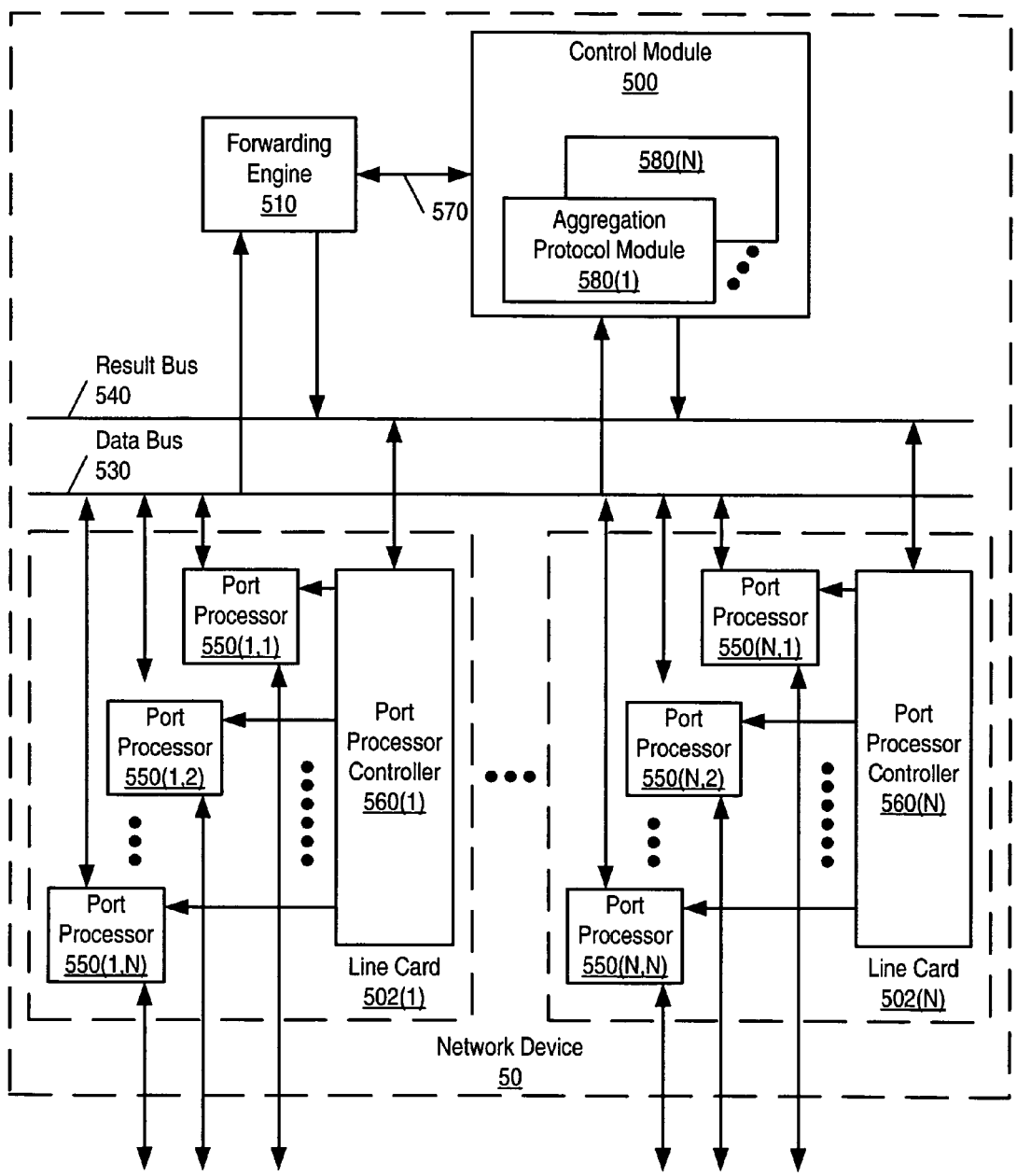
FIG. 5 is a block diagram of a network device, according to one embodiment of the present invention.

FIG. 5 shows a block diagram of a network device 50 (e.g., one of network nodes 10(0)-10(N) of FIGS. 1 and 2). In this depiction, network device 50 includes a number of line cards (line cards 502(1)-502(N)) that are communicatively coupled to a forwarding engine 510 and a control module (e.g., a route processor) 500 via a data bus 530 and a result bus 540. Line cards 502(1)-502(N) include a number of port processors 550(1,1)-550(N,N) which are controlled by port processor controllers 560(1)-560(N). It will also be noted that forwarding engine 510 and control module 500 are not only coupled to one another via data bus 530 and result bus 540, but are also communicatively coupled to one another by a communications link 570. It is noted that in alternative embodiments, each line card can include a forwarding engine. A module that implements an aggregation protocol (e.g., PAgP or LACP) can be instantiated in control module 500 (alternatively, this module can be instantiated in port processor controllers 560(1)-560(N)). If network device 500 establishes multiple aggregation protocol sessions over a single link (e.g., if network device 500 is implementing Node 10(0) of FIG. 1), network device 50 can instantiate multiple aggregation protocol modules 580(1)-580(N), one for each aggregation protocol session, as shown in FIG. 5.

When a packet is received, the packet is identified and analyzed by a network device such as network device 50 in the following manner, according to embodiments of the present invention. Upon receipt, a packet (or some or all of its control information) is sent from the one of port processors 550(1,1)-550(N,N) at which the packet was received to one or more of those devices coupled to data bus 530 (e.g., others of port processors 550(1,1)-550(N,N), forwarding engine 510 and/or control module 500). Handling of the packet can be determined, for example, by forwarding engine 510. For example, forwarding engine 510 may determine that the packet should be forwarded to one or more of port processors 550(1,1)-550(N,N). This can be accomplished by indicating to corresponding one(s) of port processor controllers 560(1)-560(N) that the copy of the packet held in the given one(s) of port processors 550(1,1)-550(N,N) should be forwarded to the appropriate one of port processors 550(1,1)-550(N,N).

In the example of FIG. 5, one or more of port processors 550(1,1)-550(N,N) can be configured as interfaces that are coupled to other network nodes by a daisy chain. As aggregation protocol packets are received by port processors 550(1,1)-550(N,N), port processor controllers 560(1)-560(N) can process the aggregation protocol packets and transition the states of their respective port processors 550(1,1)-550(N,N) as shown in FIG. 4.

It is noted that in some embodiments, if network device 50 is a non-primary network node (e.g., if network device 50 is a satellite device), network device 50 may not include certain functionality, such as control module 500. In such an embodiment, functionality needed to participate in an aggregation protocol is implemented in port processor controllers 560(1)-560(N).

Figure 6:
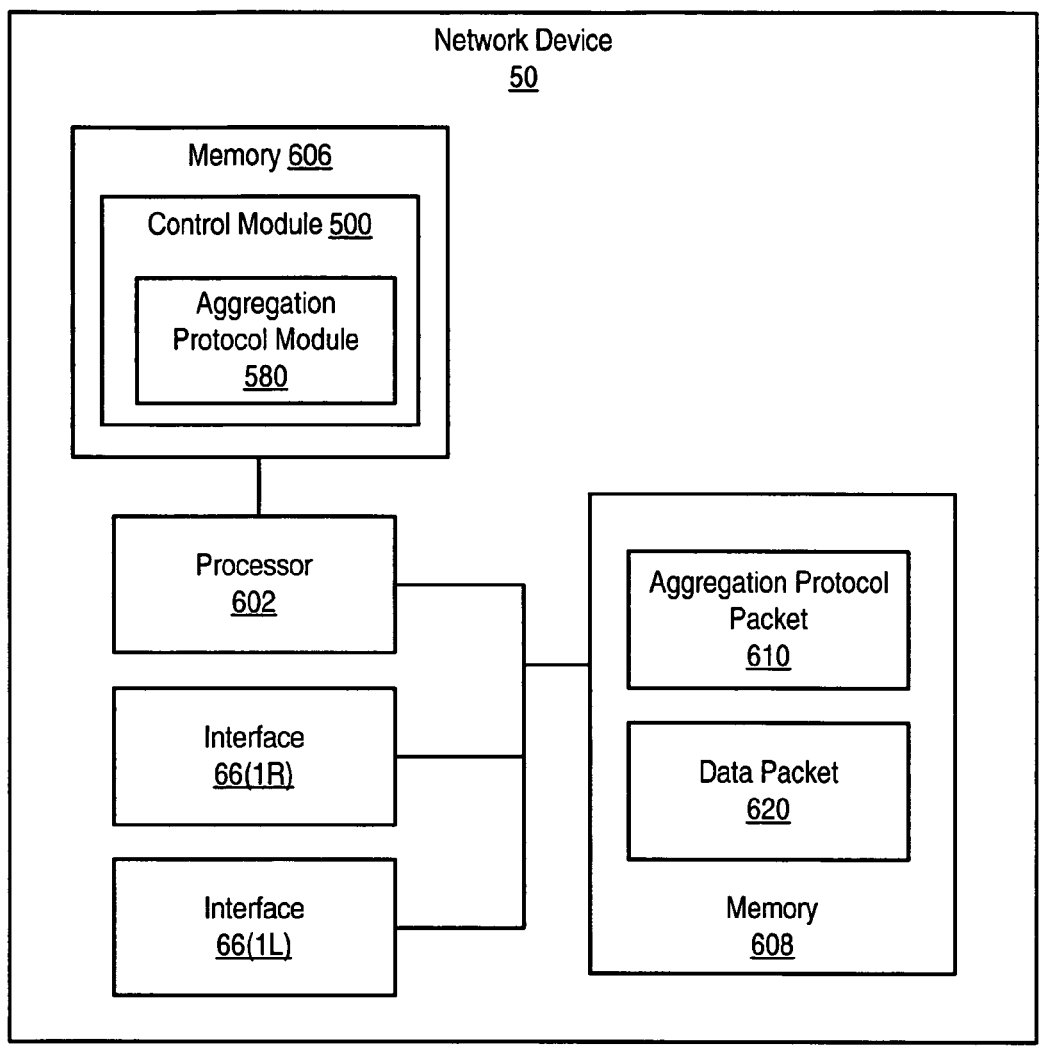
FIG. 6 is another block diagram of a network device, according to one embodiment of the present invention.

FIG. 6 is another block diagram of network device 50 (e.g., one of network nodes 10(0)-10(N) of FIGS. 1 and 2), which illustrates how aggregation protocol controller can be implemented in software. As illustrated, network device 50 includes one or more processors 602 (e.g., microprocessors, PLDs (Programmable Logic Devices), or ASICs (Application Specific Integrated Circuits)) configured to execute program instructions stored in memory 606. Memory 606 can include various types of RAM (Random Access Memory), ROM (Read Only Memory), Flash memory, MEMS (Micro Electro-Mechanical Systems) memory, and the like. Processor 602 and memory 606 can be included in a port processor (e.g., port processors 550(1,1)-550(N,N) of FIG. 5), a port processor controller (e.g., port processor controllers 560(1)-560(N)), a forwarding engine (e.g., forwarding engine 510 of FIG. 5), or a route processor (e.g., control module 500 of FIG. 5). Processor 602 and memory 606 are coupled to send and receive data and control signals by a bus or other interconnect.

Network device 50 also includes interfaces 66(1L) ("L" indicates the left, or west, interface of a device connected to other devices in a daisy chain or protected daisy chain) and 66(1R) ("R" indicates the right, or east, interface of a device connected to other devices in a daisy chain or protected daisy chain). In response to receiving a packet (e.g., such as aggregation protocol packet 610 or data packet 620), interfaces 66(1L) and 66(1R) can store copies of the received packets in memory 608. Processor 602, interfaces 66(1L) and 66(1R), and memory 608 are coupled to send and receive data and control signals by a bus or other interconnect.

In this example, program instructions executable to implement control module 500, which includes aggregation protocol module 580, are stored in memory 606. If network device 50 is a device that is establishing multiple aggregation protocol sessions (each with a different network node on a daisy chain), network device 50 can include multiple aggregation protocol modules 580 (one per aggregation protocol session). The program instructions and data implementing control module 18 can be stored on various computer readable media such as memory 606. In some embodiments, such software is stored on a computer readable medium such as a CD (Compact Disc), DVD (Digital Versatile Disc), hard disk, optical disk, tape device, floppy disk, and the like). In order to be executed by processor 602, the instructions and data implementing control module 500 are loaded into memory 606 from the other computer readable medium. The instructions and/or data implementing control module 500 can also be transferred to network device 50 for storage in memory 606 via a network such as the Internet or upon a carrier medium. In some embodiments, a computer readable medium is a carrier medium such as a network and/or a wireless link upon which signals such as electrical, electromagnetic, or digital signals, on which the data and instructions implementing control module 500 are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    sending a first aggregation protocol packet and a first session identifier associated therewith to a first network device via a first interface of a sending network device, wherein the first session identifier identifies a first aggregation protocol session between the sending network device and the first network device; and
    sending a second aggregation protocol packet and a second session identifier associated therewith to a second network device via the first interface, wherein the second session identifier identifies a second aggregation protocol session between the sending network device and the second network device, and wherein the first network device is coupled between the sending network device and the second network device to form a daisy chain network.

2. The method of claim 1, further comprising:
    establishing the first aggregation protocol session with the first network device, in response to the sending network device receiving a third aggregation protocol packet from the first network device, wherein
        the third aggregation protocol packet is associated with the first session identifier; and
    establishing the second aggregation protocol session with a second network device, in response to the sending network device receiving a fourth aggregation protocol packet from the second network device, wherein
        the fourth aggregation protocol packet is associated with the second session identifier.

3. The method of claim 1, further comprising:
    initiating a third aggregation protocol session with the first network device, wherein
        the initiating comprises sending a third aggregation protocol packet and a third session identifier via a second interface; and
    initiating a fourth aggregation protocol session with the second network device, wherein the initiating comprises sending a fourth aggregation protocol packet and a fourth session identifier via the second interface, and the first network device and the second network device are coupled to form a protected daisy chain network.

4. The method of claim 2, further comprising:
determining how to forward a packet from the first network device; and
sending information identifying how to forward the packet to the first network device, wherein
the information is associated with the first session identifier.

5. The method of claim 3, further comprising:
detecting a failure that inhibits communication with the first network device via the first interface; and
transferring a role of active interface from the first interface to the second interface in response to detection of the failure.

6. A method comprising:
receiving a first aggregation protocol packet and a first session identifier via a first interface of a first network device, wherein the first session identifier is associated with the first aggregation protocol packet, and wherein the first session identifier identifies a first aggregation protocol session between a primary network device and the first network device;
sending a responsive aggregation protocol packet and the first session identifier from the first interface to the primary network device, wherein
the responsive aggregation protocol packet is associated with the first session identifier;
receiving a second aggregation protocol packet and a second session identifier via the first interface of the first network device, wherein the second session identifier is associated with the second aggregation protocol packet, and wherein the second session identifier identifies a second aggregation protocol session between the primary network device and a second network device; and
sending the second aggregation protocol packet and the second session identifier from a second interface of the first network device to the second network device.

7. The method of claim 6, further comprising:
receiving a packet via the first interface;
processing the packet if the packet is associated with the first session identifier; and
sending the packet via the second interface if the packet is associated with the second session identifier.

8. A network device comprising:
a first interface; and
an aggregation protocol module coupled to the first interface, wherein the aggregation protocol module is configured to:
send a first aggregation protocol packet and a first session identifier associated therewith to a first network device via the first interface, wherein the first session identifier identifies a first aggregation protocol session between the network device and the first network device; and
send a second aggregation protocol packet and a second session identifier associated therewith to a second network device via the first interface, wherein the second session identifier identifies a second aggregation protocol session between the network device and the second network device, and wherein the network device is configured to be coupled to the first network device and the second network device in a daisy chain.

9. The network device of claim 8, wherein the aggregation protocol module is configured to:
establish the first aggregation protocol session with the first network device, in response to receiving a third aggregation protocol packet from the first network device, wherein
the third aggregation protocol packet is associated with the first session identifier; and
establish the second aggregation protocol session with a second network device, in response to receiving a fourth aggregation protocol packet from the second network device, wherein
the fourth aggregation protocol packet is associated with the second session identifier.

10. The network device of claim 9, further comprising:
a control module, wherein
the control module is configured to generate information identifying how to forward a packet from the first network device,
the control module is configured to send the information to the first network device, and
the information is associated with the first session identifier.

11. The network device of claim 10, further comprising:
a second interface coupled to the aggregation protocol module; wherein
the first network device and the second network device are coupled to form a protected daisy chain network; and
the aggregation protocol module is configured to:
initiate a third aggregation protocol session with the first network device, wherein
initiating the third aggregation protocol session comprises sending a third aggregation protocol packet and a third session identifier via a second interface; and
initiate a fourth aggregation protocol session with the second network device, wherein
initiating the fourth aggregation protocol session comprises sending a fourth aggregation protocol packet and a fourth session identifier via the second interface.

12. The network device of claim 11, wherein the aggregation protocol module is configured to:
detect a failure that inhibits communication with the first network device via the first interface; and
transfer a role of active interface from the first interface to the second interface in response to detection of the failure.

13. A network device comprising:
a first interface configured to receive an aggregation protocol packet;
a second interface; and
an aggregation protocol module coupled to the first interface and the second interface, wherein the aggregation protocol module is configured to:
process the aggregation protocol packet, if the aggregation protocol packet is associated with a first session identifier, wherein the first session identifier identifies a first aggregation protocol session between a primary network device and the network device; and
send the aggregation protocol packet from the second interface to a second network device, if the aggregation protocol packet is associated with a second session identifier, wherein the second session identifier identifies a second aggregation protocol session between the primary network device and the second network device.

14. The network device of claim 13, wherein
the aggregation protocol module is configured to generate a responsive aggregation protocol packet, if the aggregation protocol packet is associated with the first session identifier; and
the aggregation protocol module is configured to output the responsive aggregation protocol packet via the first interface.

15. A system comprising:
means for sending a first aggregation protocol packet and a first session identifier associated therewith to a first network device via a first interface of a sending network device, wherein the first session identifier identifies a first aggregation protocol session between the sending network device and the first network device; and
means for sending a second aggregation protocol packet and a second session identifier associated therewith to a second network device via the first interface, wherein the second session identifier identifies a second aggregation protocol session between the sending network device and the second network device, and wherein the first network device is coupled between the sending network device and the second network device to form a daisy chain network.

16. A system comprising:
means for receiving a first aggregation protocol packet and a first session identifier via a first interface of a first network device, wherein the first session identifier is associated with the first aggregation protocol packet, and wherein the first session identifier identifies a first aggregation protocol session between a primary network device and the first network device;
means for sending a responsive aggregation protocol packet from the first interface to the primary network device, wherein the responsive aggregation protocol packet is associated with the first session identifier;
means for receiving a second aggregation protocol packet and a second session identifier via the first interface of the first network device, wherein the second session identifier is associated with the second aggregation protocol packet, and wherein the second session identifier identifies a second aggregation protocol session between the primary network device and a second network device; and
means for sending the second aggregation protocol packet and the second session identifier from a second interface of the first network device to the second network device.

\* \* \* \* \*